United States Patent [19]

Chiu et al.

[11] Patent Number: 5,597,130

[45] Date of Patent: Jan. 28, 1997

[54] TAPE WINDING LINKAGE OF DRUM TYPE MAGNETIC RECORDING AND REPRODUCING APPARATUS

[75] Inventors: Ming-Jer Chiu, Hsinchu; Jaw-Horng Tzeng, Fungsan, both of Taiwan

[73] Assignee: Industrial Technology Research Institute, Hsinchu, Taiwan

[21] Appl. No.: 493,291

[22] Filed: Jun. 21, 1995

[51] Int. Cl.$^6$ .............................................. G11B 15/665
[52] U.S. Cl. ................................................ 242/356
[58] Field of Search ................................. 242/356, 358; 360/95

[56] References Cited

U.S. PATENT DOCUMENTS

| | | | |
|---|---|---|---|
| 3,355,119 | 11/1967 | Johnson et al. | 242/356.4 |
| 4,616,274 | 10/1986 | Nagaoka | 360/95 |
| 4,868,693 | 9/1989 | Tsutsumi et al. | 360/95 |
| 5,025,333 | 6/1991 | Feinberg et al. | 360/95 |
| 5,128,814 | 7/1992 | Morimoto | 360/95 |
| 5,262,909 | 11/1993 | Chiou et al. | 360/95 |

FOREIGN PATENT DOCUMENTS 56-11644  2/1981  Japan ........................... 360/95

*Primary Examiner*—John P. Darling
*Attorney, Agent, or Firm*—Beveridge, DeGrandi, Weilacher & Young, L.L.P.

[57] ABSTRACT

A kind of tape winding linkage of drum type magnetic recording and reproducing apparatus, comprising a tape winding gear, a first and a second links both with two joints, a third link with two joints having spring effect. The first link is attached to the shaft of the tape winding gear while the second link is connected to the first link by its first pivot joint and connected to the third link by its second pivot joint, also its second link's guided pin is being embedded in the guided slot of the deck such that it can move along the guided slot of the deck. What is more, the third link is connected to the inclined pole base by its third pivot joint. As the loading gear is driven by the power source's mechanism, the third link which possess spring effect is compressed and produced reacting force such that it makes the inclined pole base to move along the guided slot of the deck at the tape winding and unwinding position so as to divert the tape out of the cassette and wind around the magnetic drum.

7 Claims, 12 Drawing Sheets

TAPE WINDING LINKAGE OF DRUM TYPE MAGNETIC RECORDING AND REPRODUCING APPARATUS

FIELD OF THE INVENTION

The present invention is related to a tape winding linkage of drum type magnetic recording and reproducing apparatus that can simplify the transmission element mechanism, lower the cost and make it easy to assemble.

BACKGROUND OF THE INVENTION

The prior art's winding linkage of drum type magnetic recording and reproducing apparatus has all the links, i.e. the first, second and third links being two-joint links. A tape winding torsion spring is attached in between the first link and the tape winding gear such that one end of the torsion spring connects to the tape winding gear and the other end tightly presses against the first link after being preloaded. As both of the tape winding gears and tape winding links are driven by the power source, the inclined pole base moves along the deck's slot at the tape winding and tape unwinding positions, thereby to divert the tape out of the cassette and wind around the magnetic drum. However, this kind of structure requires relatively more elements which make the assembling procedure very complicated and therefore is inconvenient, Besides, it needs a lot more spaces.

SUMMARY OF THE INVENTION

The main purpose of the invention is to provide a kind of tape winding linkage of drum type magnetic recording and reproducing apparatus wherein the tape winding torsion spring between the tape winding gear and the first link is removed to simplify the machine members and assembling work. The third link, having spring effect, is a two-joint link. It is driven by tape winding gear through the first and the second link and it then compresses the third link to produce reacting force which in sequence, transmits the force to the inclined pole base, thus produces a force to press against the V-slot.

What is more, by its reacting force it transmits back to the tape winding gear which creates a compressing force to the cam to make inclined pole on the inclined pole base divert the tape smoothly out of the cassette and wind around the magnetic drum.

The next purpose of the invention is to disclose a kind of tape winding linkage of drum type magnetic recording and reproducing apparatus wherein the second link can be substituted by a buckling link to make the inclined pole base produce force to press against the drum base by use of the spring action of the second link, thereby to replace the traditional torsion spring action of tape winding.

The other purpose of the present invention is to provide an integral tape winding linkage comprising the first link and tape winding gear to further lower the cost and make the assembling work much easier.

Figure 1:
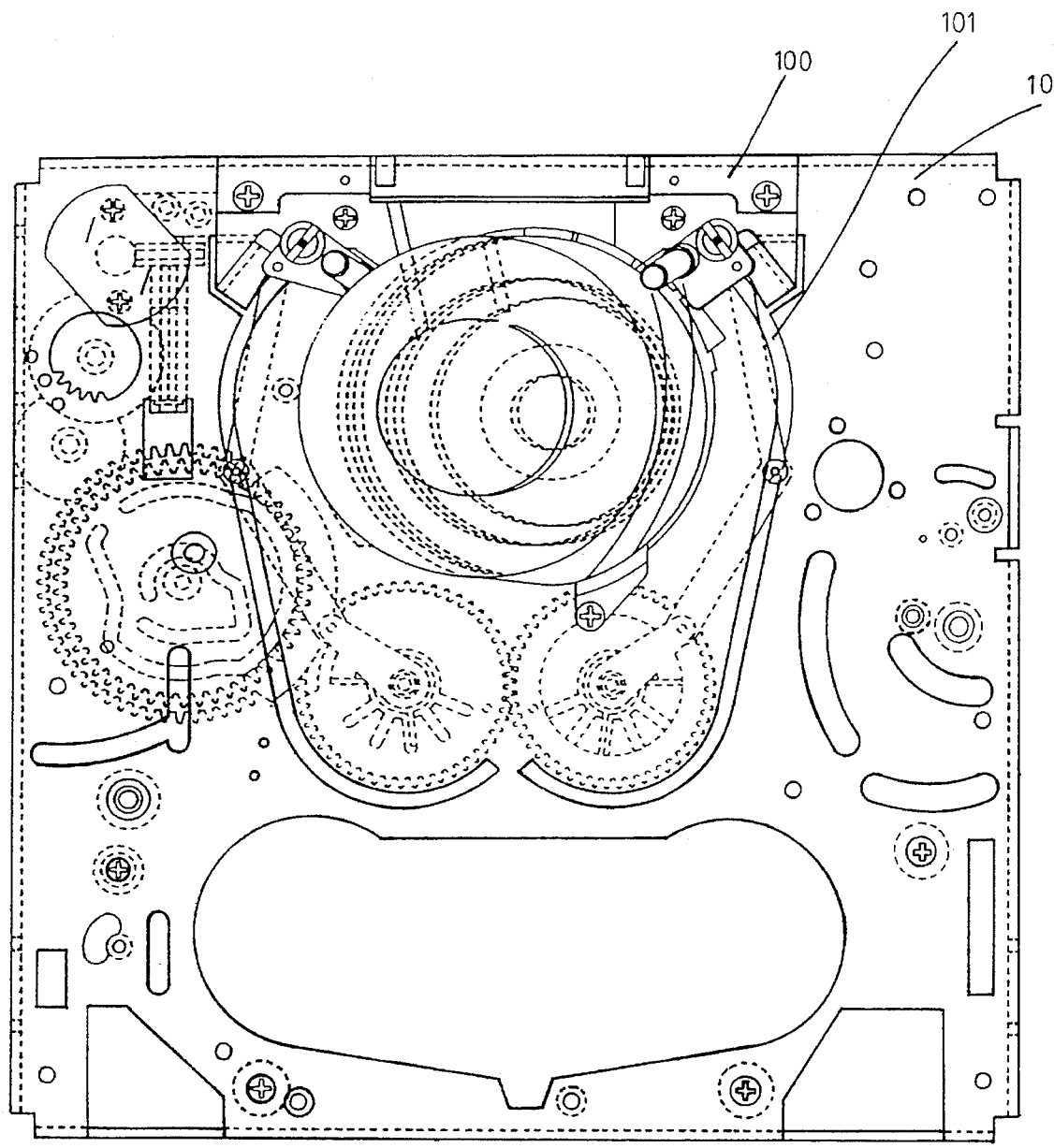
FIG. 1 is the general layout of the traditional tape winding linkage.

| Designation in the Drawings | |
|---|---|
| 10 Deck | 305 Cassette |
| 100 Drum base | 306 Guided wheel positioner |
| 101 Deck guided slot | 307 Inclined pole base positioner |
| 11 Tape winding gear | 40 The first link |
| 111 Tape winding torsion spring | 400 The second link |
| | 401 The first pivot joint |
| 112 Gear shaft | 402 The second pivot joint |
| 20 The first link | 403 The second link's guided pin |
| 201 The first pivot joint | 404 The third pivot joint |
| 202 The second link | 405 The screw part of the spring |
| 203 The second pivot joint | 406 Buckling type two-joint link |
| 204 The third link | 407 Torsion spring |
| 205 The third pivot joint | 408 Compression spring |
| 30 Inclined pole base | 50 Motor |
| 301 Inclined pole | 501 Gear train |
| 302 Inclined pole base guided pin | 60 Cam |
| 303 Drum | |
| 304 Tape | |

DETAILED DESCRIPTION OF THE INVENTION

Figure 2A:
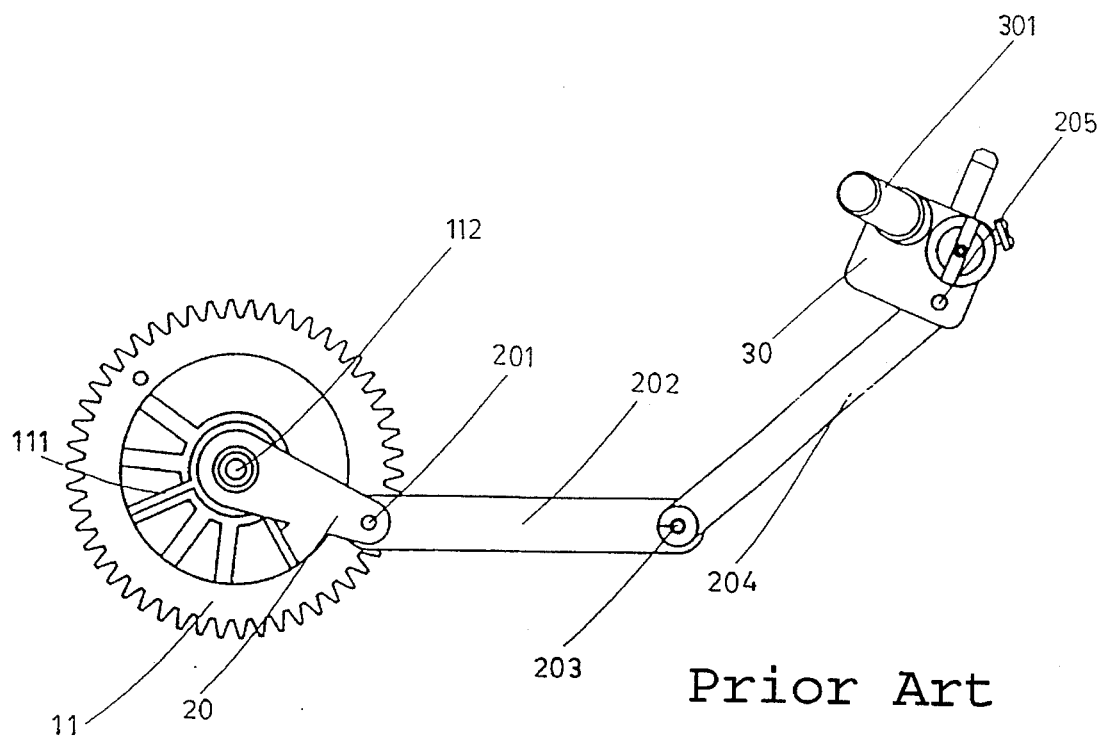
FIGS. 2(a) and 2(b) are the assembled structure of the traditional tape winding linkage.
Figure 2B:
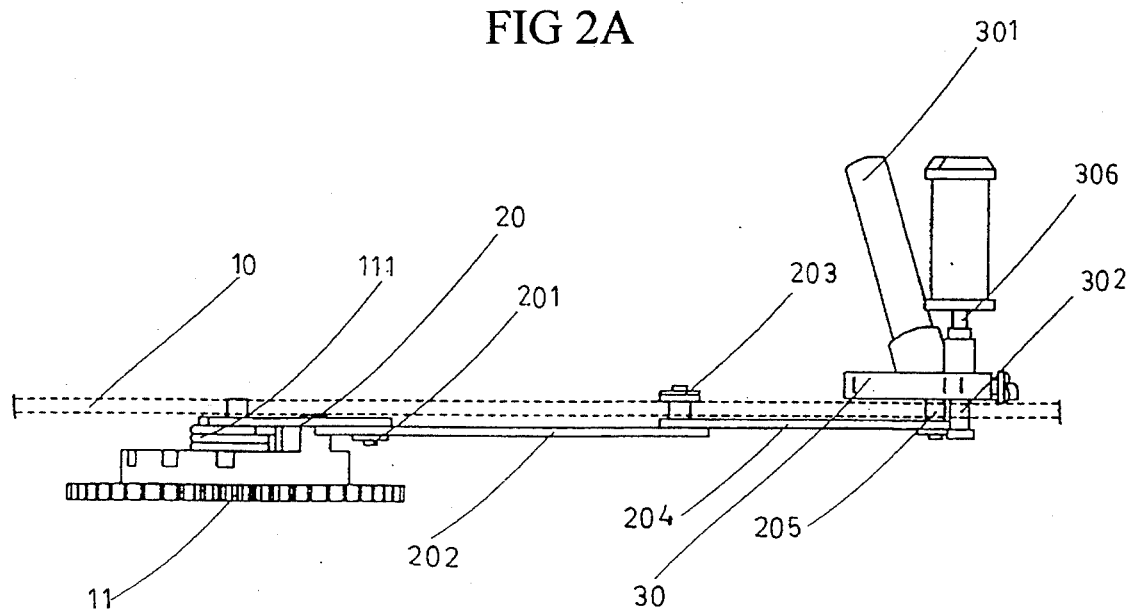
Figure 3:
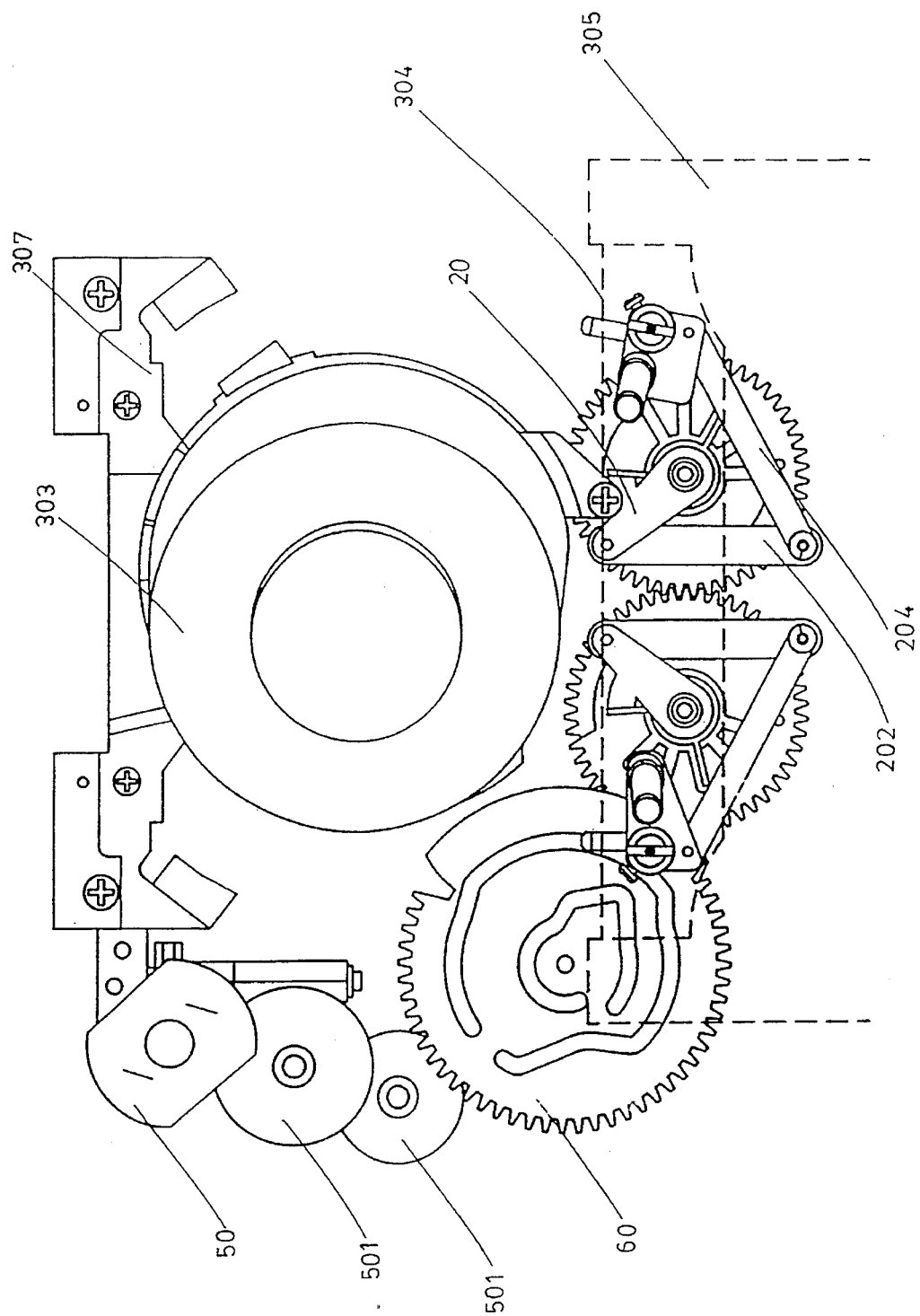
FIG. 3 is the schematic diagram at the tape unwinding position of the traditional tape winding linkage.
Figure 4:
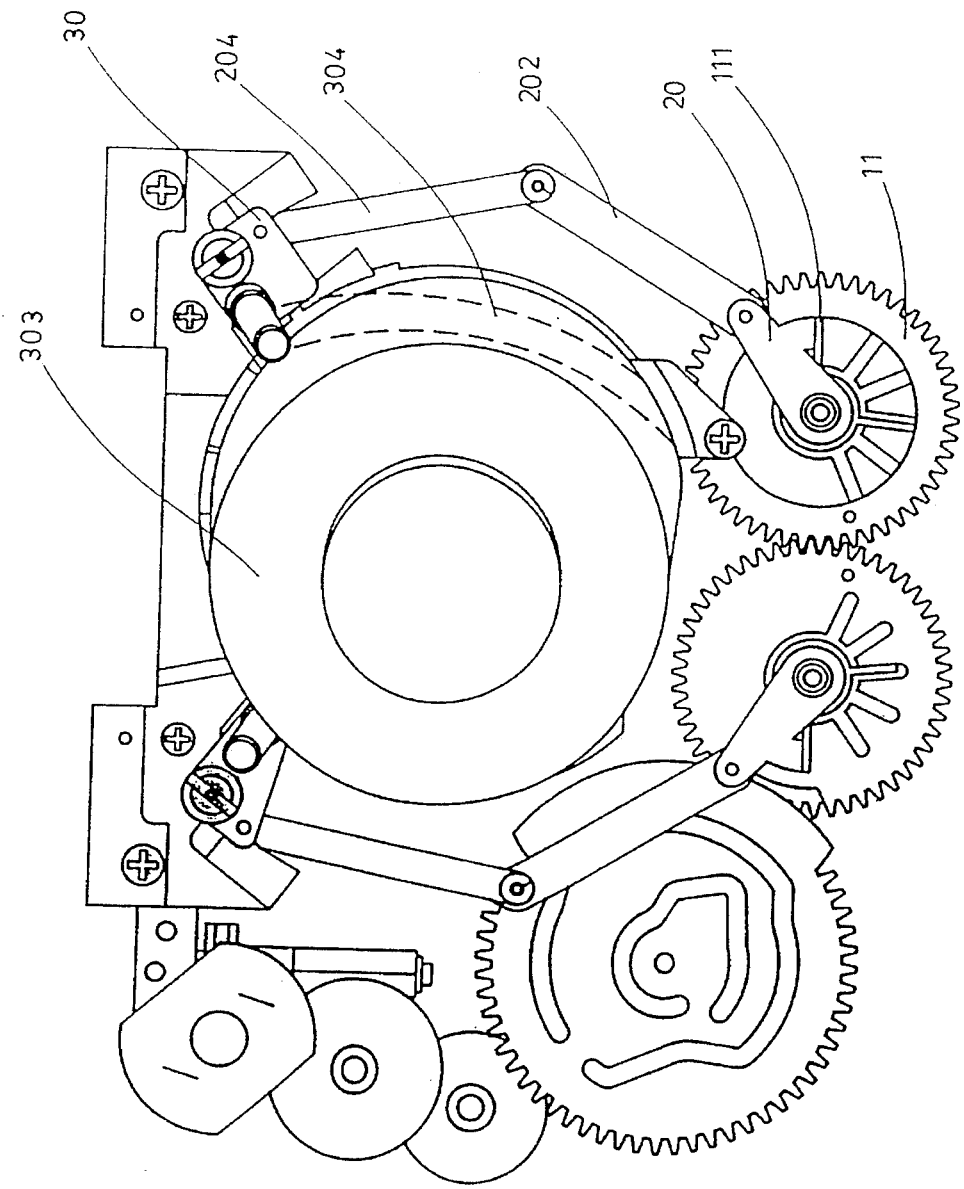
FIG. 4 is the schematic diagram at the tape winding position of the traditional tape winding linkage.

Referring to FIG. 1, the general layout of the traditional tape winding linkage and comparing to FIGS. 2A and 2B, the assembled structure, the tape winding links are divided into two parts installed on the deck 10 wherein a tape winding torsion spring 111 is installed between the first link 20 and tape winding gear 11. The tape winding torsion spring 111 has one of its end connected to the tape winding gear 11 and its other end pressed tightly against the first link 20 after being preloaded. The second link 202 is connected to the first link 20 by the first pivot joint 201 and is connected to the third link 204 by the second pivot joint 203. The third link 204 is connected to the inclined pole base 30 by the third pivot joint 205, furthermore, the third pivot joint 205, the inclined pole base guided pin 302 on its inclined pole base 30 as well as the second pivot joint 203 are all embedded in the deck's guided slot 101. By use of all of these elements, the inclined pole base 30 on both the left and right hand sides moves along the deck's guided slot 101 at the tape unwinding and tape winding positions (as shown in FIG. 3 and FIG. 4) when the motor 50 drives the gear train 501 to rotate the tape winding gear 11 and tape winding linkage of both the left and right hand sides', thereby, divert the tape 304 out of the cassette 305 and wind around the drum 303 by use of its inclined pole 301. At this moment, the guided wheel positioner 306 up touches the inclined pole base positioner 307 of the drum base 100 which make the inclined pole base 30 and linkage subject to be constrained and stop moving, in the same time, the tape winding gear 11 keeps on rotating a angle θ to drive the tape winding torsion spring 111 to increase torsional amount which make the inclined pole base 30 press tightly against the drum base 100.

As stated above, the portion of tape winding gear 11 comprises three layers of structure in the traditional tape winding linkage, thereby, when it comes to assembling, one must follows the procedures as shown belows:

1. Install the first link 20 to the gear shaft 112 on the deck 10;
2. Install the tape winding torsion spring 111 with one of its end tightly presses against the first link 20;
3. Install the tape winding gear 11 with the other end of the tape winding torsion spring fixed;
4. Align the phase angles of both of the tape winding gear at the left and right hand side.

Due to the three layers of structure causing the tedious assembling work and the spring action of the tape winding torsion spring 111 in between, it is not an easy work to set up the tape winding gear 11 and align the phase angles.

Figure 5C:
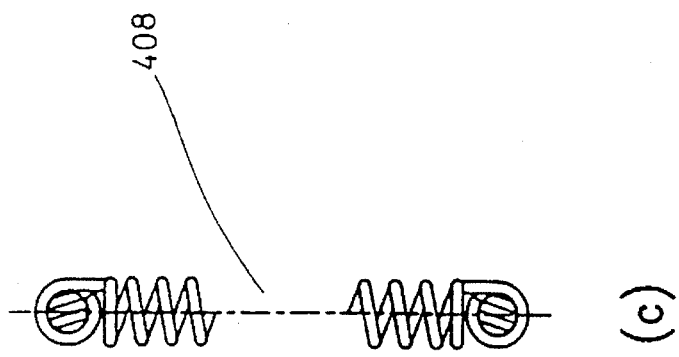
FIGS. 5(a)–(c) are the schematic structural diagram of the third link of the present invention.
Figure 5B:
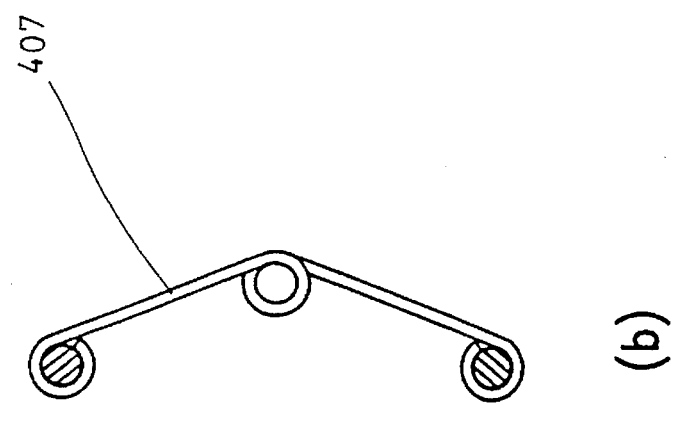
Figure 5A:
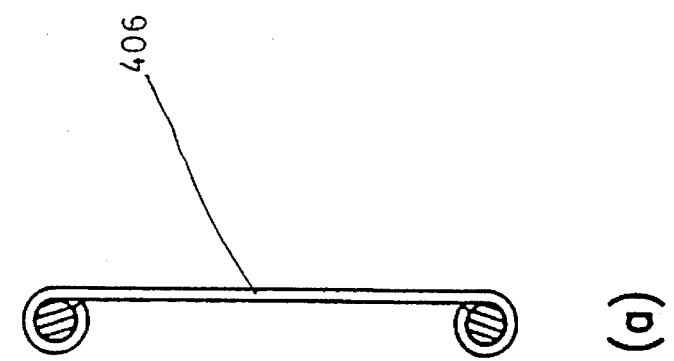

FIGS. 5A, 5B and 5C are the schematic structural diagram of the third link of the present invention, as shown in portion (a), it is a buckling type two-joint link 406, having spring effect and portion (b) is a torsion type two-joint link 407 having spring effect also, while portion (c) is a compression type two-joint link 408 to replace the traditional third link. As any one of the above mentioned two-joint link having spring effect is subjected to deformation, it will produce a reacting force which in sequence, will transmit to the inclined pole base 30 making the inclined pole base create a force to press tightly against the V-slot (the magnitude of the tight-press force can be obtained directly from the design of the spring link's dimension) and the above mentioned two-joint link having spring effect, can also transmit its reacting force back to tape winding gear 11 which generate a pressed force to the cam 60 till the tape tends to unwind, the tape winding gear 11 will then follow the trend of the pressed force and engage into the cam 60, not untill the link, which substitutes a spring, restores to its free length, it will bring the inclined pole base 30 to retreat.

Figure 6:
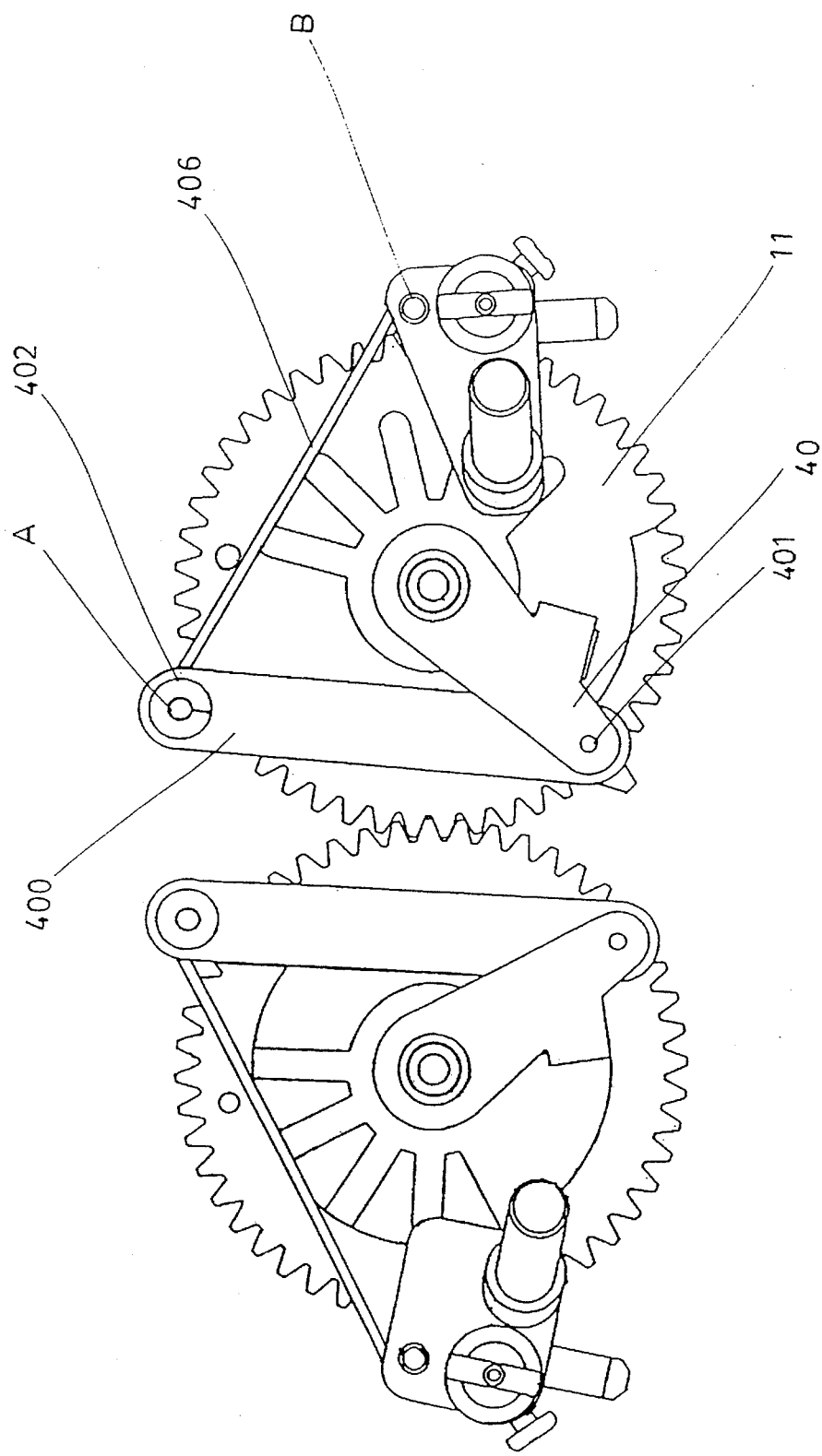
FIG. 6 is the schematic diagram at the tape unwinding position of the embodiment example 1 of the present invention.
Figure 7:
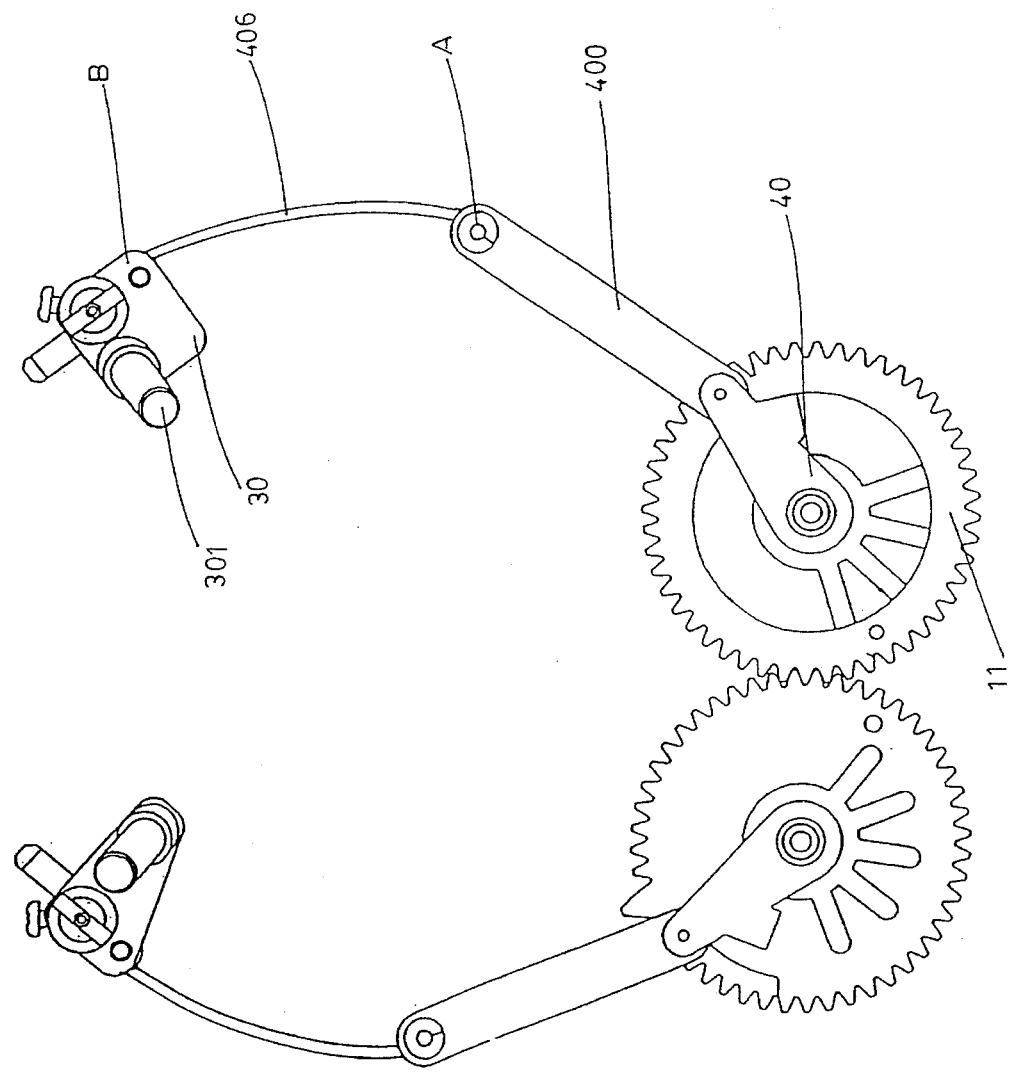
FIG. 7 is the schematic diagram at the tape winding position of the embodiment example 1 of the present invention.

Referring again to embodiment example 1 of FIG. 6, the schematic diagram at the tape unwinding position wherein a tape winding torsion spring 111 is not needed to install between the first link 40 and tape loading gear 11 and this first link 40 together with the tape winding gear 11 is an integral pan, what is more, the second link 400 is connected to the first link 40 by the first pivot joint 401; and connected to the buckling type two-joint link 406 to substitute the third link and embedded in the deck's guided slot 101 with the guided pin 403 of the second link. The buckling type two-joint link which is connected to the inclined pole base 30 by the third pivot joint will move along the deck's slot 101 by use of the second link's guided pin 403, the third pivot joint 404 and the inclined pole base's guided pin 302 wherein the linear distance from point A on the second pivot joint 402 to point B on the third pivot joint 404 is L. In the course of tape winding, the inclined pole 301 is subjected only to the tension of tape 304, wherein the tension has not yet reached the critical force, therefore, is not high enough to produce buckling action to the buckling type two-joint link. The reclined pole 301, in the same time, diverts the tape 304 out from the cassette 305 and winds around onto the drum 303. As the inclined pole base 30 reaches the V-slot on the drum base (as shown in FIG. 7) point B is then fixed and the said tape winding gear 11 also keeps on rotating which make the axial force between point A and point B exceed critical force and cause buckling, at this moment, the distance between A and B is less than L thus results in reacting spring force, thereby, makes it create the predetermined tight pressed force between the inclined pole base 30 and the drum base 100.

It is known from the aforesaid structure of the present invention that the installation steps of the tape winding gear 11 are as follows:

1. Install the first link 20 on the gear shaft 112 of the deck 10;
2. Install the tape winding gear 11;
3. Align the phase angles;

It can eliminate the influence of the tape winding torsion spring 111 while it is assembling, and is easy to install and since it has only two layers in structure it can save spaces and can assemble very quickly. Furthermore, as it does not use tape winding torsion spring 111 anymore, the first link 20 and tape winding gear 11 rotate synchronously and there is no relative motion occurred, thereby the two parts can be formed into an integral one to become a single pan which make the assembly work much easier.

Figure 8:
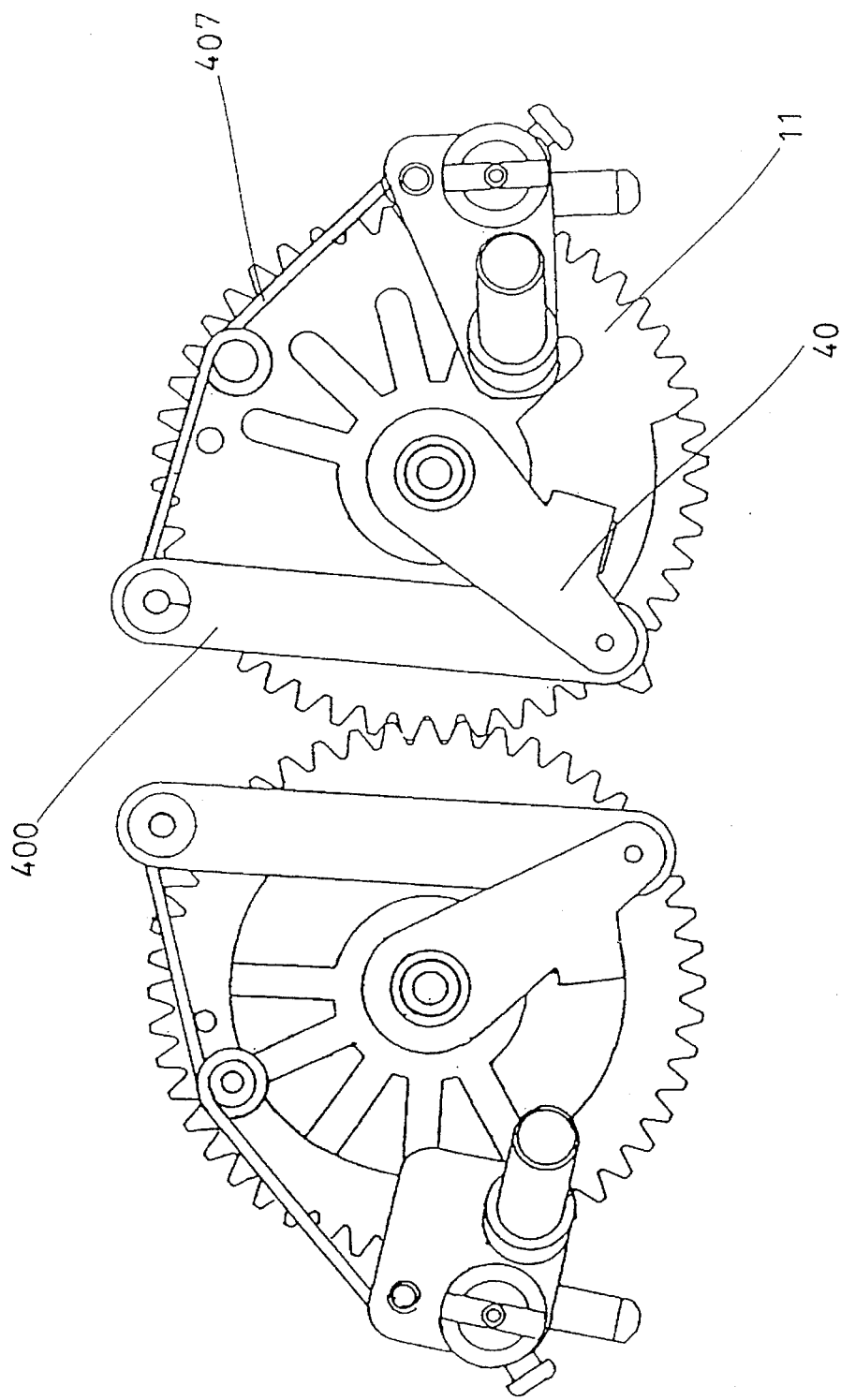
FIG. 8 is the schematic diagram at the tape unwinding position of the embodiment example 2 of the present invention.
Figure 9:
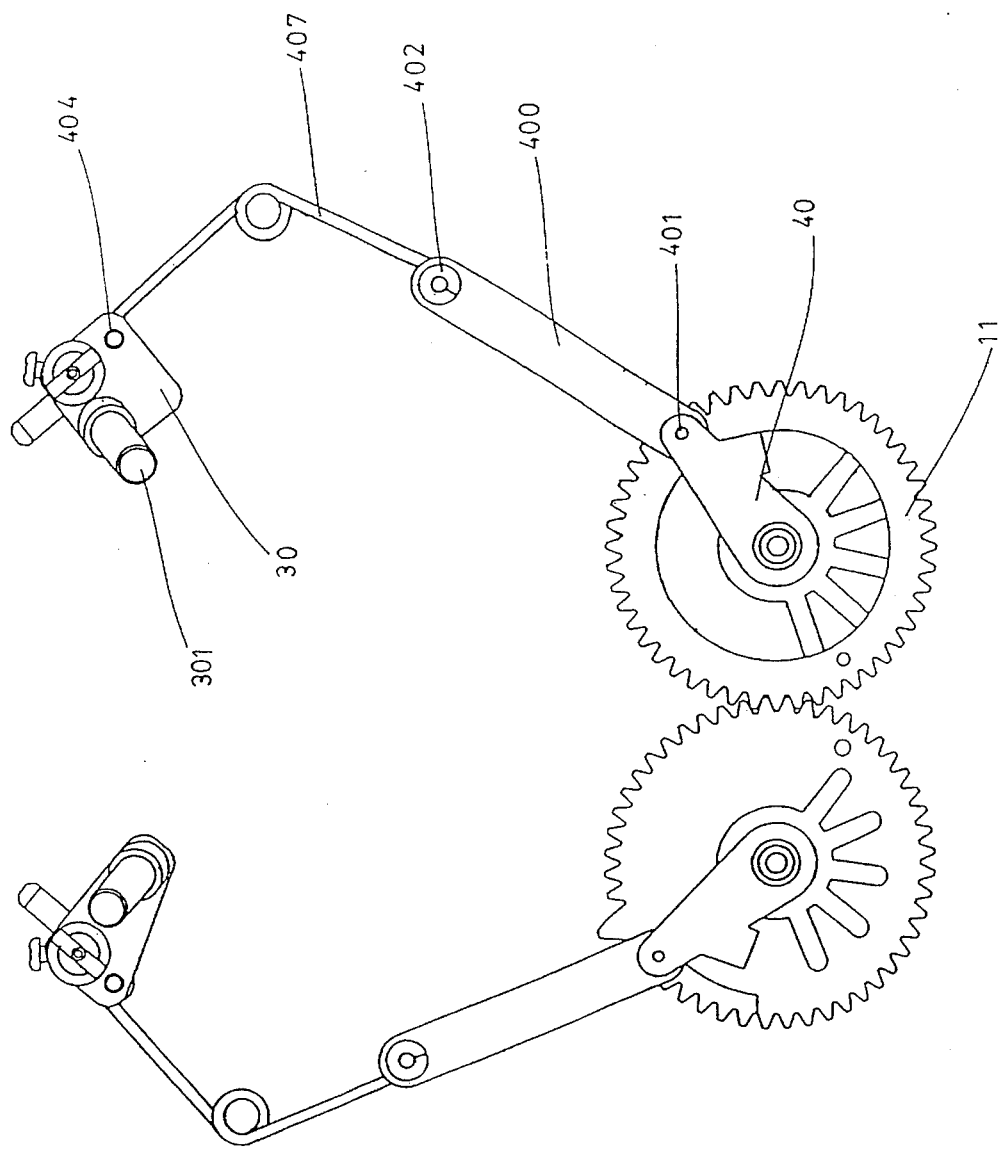
FIG. 9 is the schematic diagram at the tape winding position of the embodiment example 2 of the present invention.

Referring to FIG. 8, the schematic diagram at the tape unwinding position of the embodiment example 2 of the present invention wherein the third link is a torsion type two-joint link 407 having spring effect and comparing with FIG. 9, the schematic diagram at the tape winding position of the embodiment example 2 of the present invention wherein the torsion type two-joint link 407 which substitute the third link, is connected to the second link's guided pin 403 by the helix part 405 of the spring and this guided pin 403 is embedded in the cleck's guided slot 101. As the linkage tends to move from the tape unwinding position to the tape winding position, the torsion spring type two-joint link 407 is not subjected to a force action and is in an unloaded free state until the tape winding mode is finished, the inclined pole base 30 then presses against the V-slot on the drum base 100 without any movement, but the tape winding gear 11 still keeps on rotating an θ degree; the first and second pivot joint 401 and 402 thereby are subjected to a force action and are keeping on rotating, thereby, the torsion spring type two-joint link 407 is compressed and creating a reacting force to make the inclined pole base 30 press against the drum base 100; in the mean time, the torsion spring type two-joint link 407 also transmits the reacting force to the tape winding gear 11 which creates an pressed force to the cam 60; the tape winding gear 11 then make use of this pressed force and follows the trend to engage into the cam 60 untill the torsion spring type two-joint link 407 restores to the free length and thereafter to lead the inclined pole base 30 to retreat.

Figure 10:
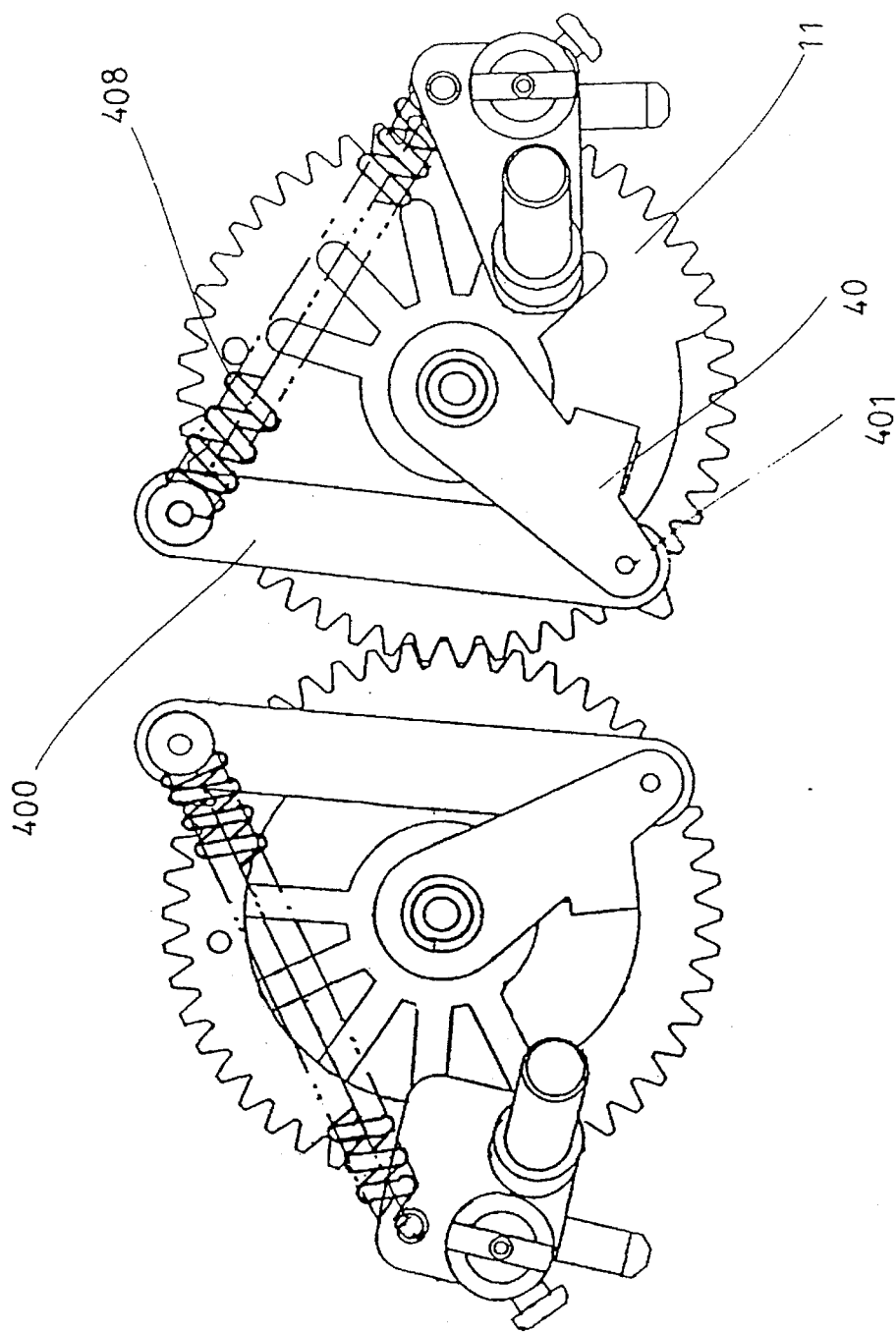
FIG. 10 is the schematic diagram at the tape unwinding position of the embodiment example 3 of the present invention.
Figure 11:
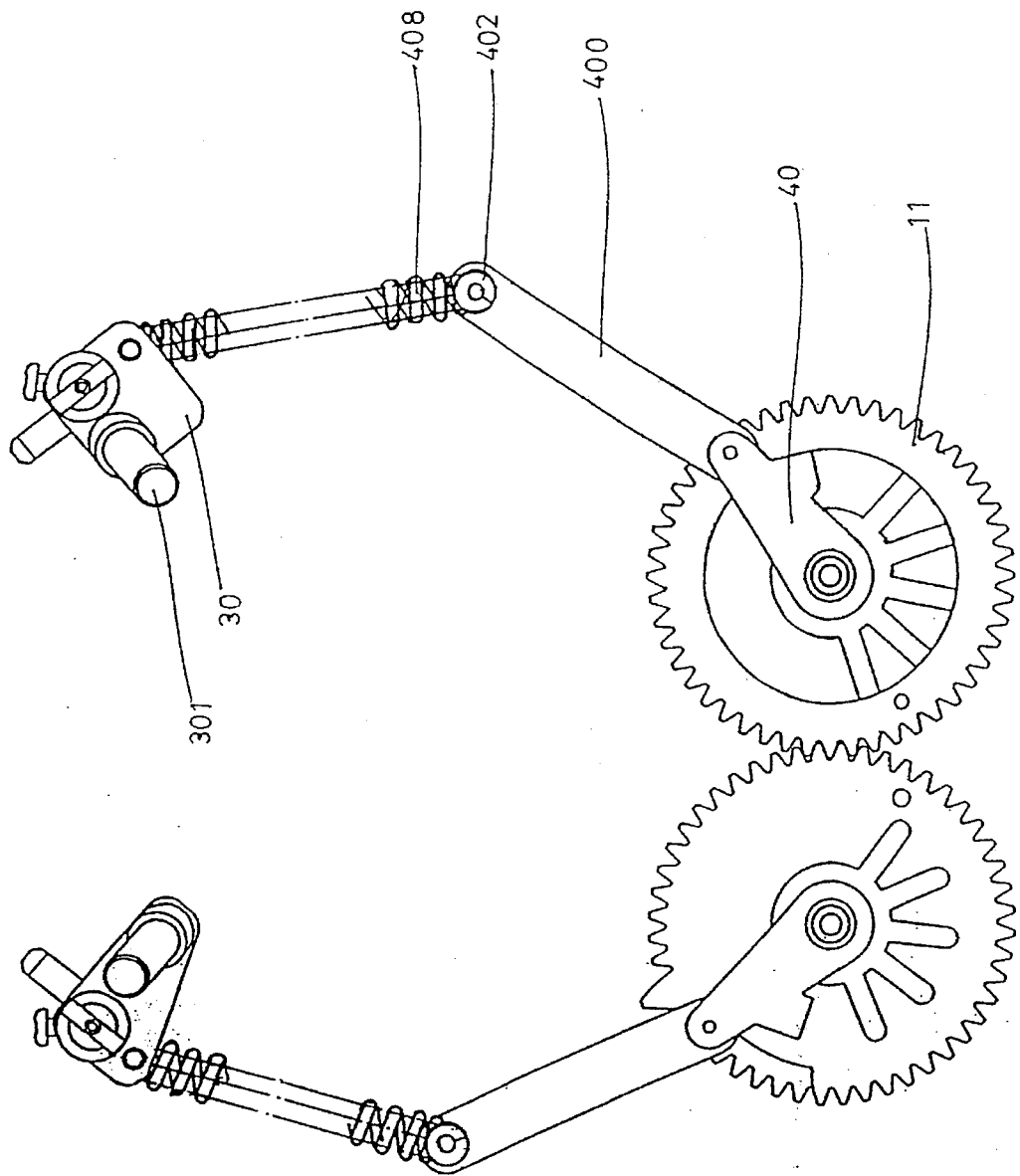
FIG. 11 is the schematic diagram at the tape winding position of the embodiment example 3 of the present invention.

FIG. 10 and FIG. 11 are the schematic diagram at the tape unwinding and winding position of the embodiment example 3 of the present invention wherein they use a compressing spring type two-joint link 408 to substitute the traditional third link; when the linkage moves from tape unwinding position to tape winding position; the compressing spring type two-joint link 408 is not subjected to force acttion and its length is a free length. As the inclined pole base 30 reaches the tape winding position and touches the drum base 100, that is, the tape winding mode is finished, the inclined base 30 will not move anymore but the tape winding gear 11 keeps on rotating a $\theta$ angle which make the compressing spring type two-joint link 408 to be compressed, and the compressive action will create a reacting force which results in creating a predetermined tight pressing force between the inclined pole base 30 and drum base 100. The magnitude of this tight pressing force can be obtained directly from the dimensions of the design of the spring link; in the meantime, the reacting force will also transmit back to the tape winding gear 11 so as to create a pressed force to the cam 60 untill the time of tape unwinding, the tape winding gear 11 then engages into cam 60 by use of the pressed force, and lead the inclined pole base 30 to retreat.

Figure 12:
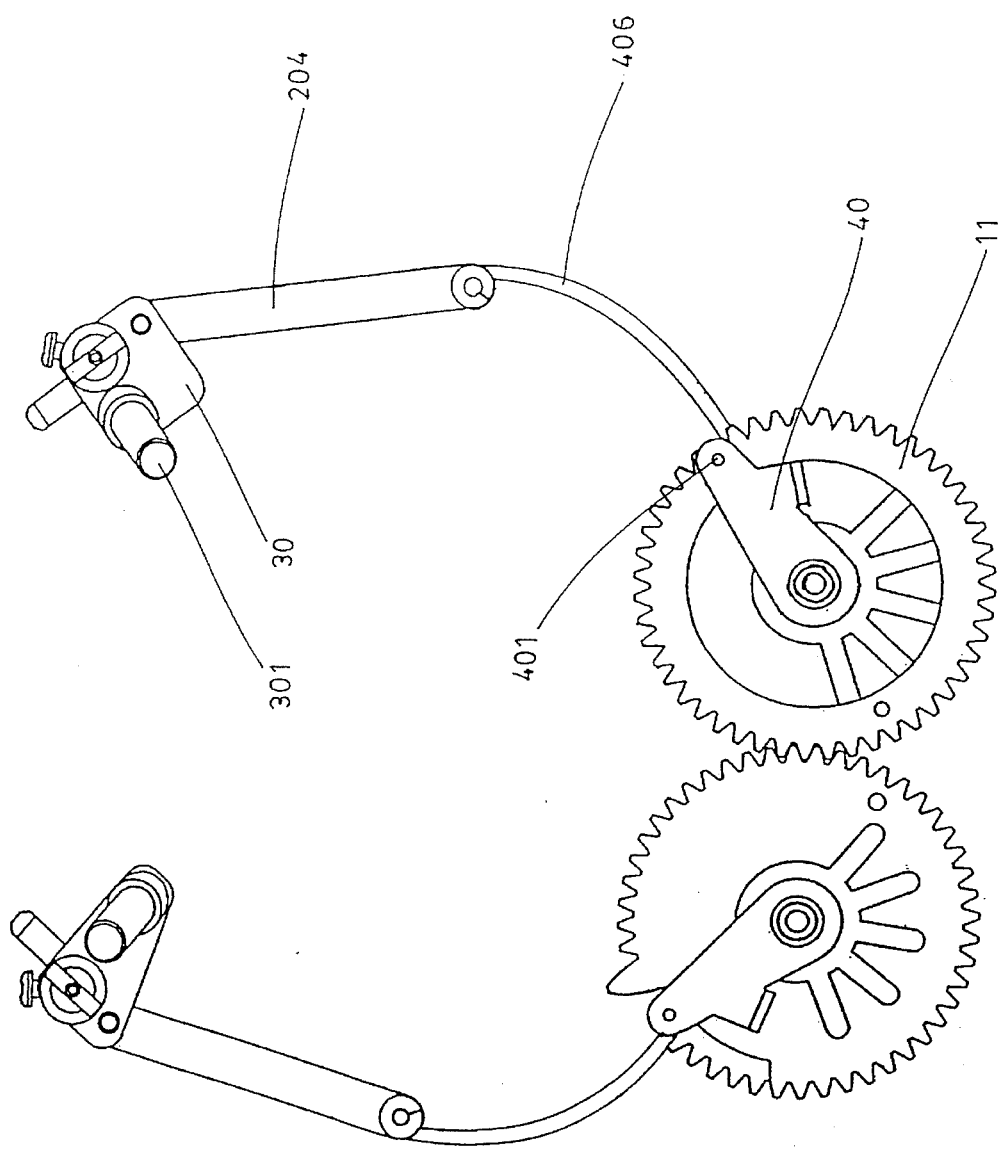
FIG. 12 is the schematic diagram at the tape winding position of the embodiment example 4 of the present invention.

As shown in FIG. 12, the embodiment example 4 of the present invention wherein the buckling type two-joint link 408 can not only substitute the traditional third link but also substitute the second link, the principles of action are the same mentioned above. By means of the spring effect of the buckling type two-joint link 408, it creates the predetermined tight pressed force between the inclined pole base 30 and drum base 100.

According the foregoing descriptions, it is known that the present invention definitely possesses the following efficacies:

1. Simplify the elements of the tape winding linkage;
2. Facilitate the assembly work;
3. Lower the cost;
4. Reduce the loading needed to increase the torque of tape winding torsion spring due to the transmission loss.

Summarizing the above statements, it is known that the present invention possesses practicability and creativity, and it is not seen in any publications and shall be in accordance with requirements of the invention.

But the foregoing statements are only some of the preferred embodiments, and these cannot be used as a limitation of the present invention.

That is, any equivalent variation and modification according to the content of the present invention will still belong to the range of the present invention.

What is claimed is:

1. A tape deck tape winding linkage of drum type magnetic recording and reproducing apparatus, comprising:

a drum base mounted on said deck;

a gear shaft;

a tape winding gear installed at the gear shaft on the deck which possesses a guide slot;

a first link which is a two-joint link with one end connected to said gear shaft of the tape winding gear;

a second link which is connected to said first link by a first pivot joint and is also connected to a third link by a second pivot joint and a second link guide pin on the second pivot joint;

the third link being a two-joint torsion spring type link; and an inclined pole base which is connected to said third link by the third pivot joint where said inclined pole base and said guide pin sliding in the guide slot on said deck;

wherein there is no tape winding torsion spring set between said tape winding gear and the first link and by permitting the second link's guide pin to slide in said guide slot, as the third link is subjected to a force action and is deformed to create a pressing force relative to the drum base and transmit a reaction force back to the tape winding gear.

2. The tape deck tape winding linkage of drum type magnetic recording and reproducing apparatus as claimed in claim 1, wherein the third link is a buckling type two-joint link.

3. The tape deck tape winding linkage of claim 2, wherein both the first link and the tape winding gear are integral.

4. The tape deck tape winding linkage of claim 1, wherein both the first link and the tape winding gear are integral.

5. The tape deck tape winding linkage of drum type magnetic recording and reproducing apparatus as claimed in claim 1, wherein the third link is a torsion spring type two-joint link.

6. The tape deck tape winding linkage of drum type magnetic recording and reproducing apparatus as claimed in claim 1, wherein the third link is compression spring type two-joint link.

7. A tape deck tape winding linkage for drum type magnetic recording and reproducing apparatus, comprising:

a drum base with a V-slot mounted on said deck;

a gear shaft;

a tape winding gear which is installed at the gear shaft on the deck which possesses a guide slot;

a first link which is a two-joint link with one end connected to said gear shaft of the tape winding gear;

a second link which is a two-joint link having spring effect, connecting to said first link by the first pivot joint and to a third link by a second pivot joint, the second pivot joint including a guide pin;

the third link being a two-joint link;

an inclined pole base, connecting said third link, said inclined pole base providing for said inclined pole base guide pin sliding in the guide slot on said deck;

wherein during tape winding, when said inclined pole base reaches the V-slot of the drum base, said second link deforms and causes said inclined pole base to press against the drum base and to create a reacting spring force.

* * * * *